United States Patent
Inui et al.

(10) Patent No.: US 7,668,459 B2
(45) Date of Patent: Feb. 23, 2010

(54) DISPERSION MONITORING METHOD AND APPARATUS AND DISPERSION SLOPE TEMPERATURE DEPENDENCY COMPENSATION METHOD AND APPARATUS

(75) Inventors: Tetsuro Inui, Yokohama (JP); Hidehiko Takara, Yokosuka (JP); Takashi Yamamoto, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1183 days.

(21) Appl. No.: 10/624,082

(22) Filed: Jul. 21, 2003

(65) Prior Publication Data
US 2007/0242956 A1  Oct. 18, 2007

(30) Foreign Application Priority Data
Jul. 23, 2002  (JP) ............................ 2002-214575

(51) Int. Cl.
*H04B 10/08* (2006.01)
(52) U.S. Cl. ............................ 398/29; 398/25; 398/28; 398/147; 398/177
(58) Field of Classification Search ................ 398/177, 398/147, 25, 29, 28
See application file for complete search history.

(56) References Cited

U.S. PATENT DOCUMENTS

| | | | |
|---|---|---|---|
| 6,307,988 B1 * | 10/2001 | Eggleton et al. | 385/37 |
| 6,396,982 B1 * | 5/2002 | Lin | 385/37 |
| 6,574,404 B2 * | 6/2003 | Sasaoka et al. | 385/123 |
| 6,925,262 B2 * | 8/2005 | Ooi et al. | 398/147 |
| 6,980,738 B1 * | 12/2005 | Frankel et al. | 398/31 |
| 7,319,821 B2 * | 1/2008 | Sakata et al. | 398/147 |
| 2001/0048798 A1 | 12/2001 | Sasaoka et al. | |
| 2002/0015207 A1 | 2/2002 | Ooi et al. | |
| 2002/0123851 A1 * | 9/2002 | Kurooka et al. | 702/69 |
| 2003/0086713 A1 | 5/2003 | Inui et al. | |
| 2003/0161580 A1 * | 8/2003 | Morin et al. | 385/37 |

FOREIGN PATENT DOCUMENTS

EP    1 309 115 A2    5/2003

(Continued)

OTHER PUBLICATIONS

T. Inui et al., *Adaptive Dispersion Slope Equalizer for Dispersion-shifted Fibers Using a Nonlinearly Chirped Fiber Bragg Grating Pair*, The 4th Pacific Rim Conference on Lasers and Electro-Optics, Jul. 15, 2001, Volume Supplement 2001, pp. 14-15 suppl.

(Continued)

*Primary Examiner*—Ken N Vanderpuye
*Assistant Examiner*—Hibret A Woldekidan
(74) *Attorney, Agent, or Firm*—Workman Nydegger

(57) ABSTRACT

In a wavelength division multiplexing optical transmission system, in order to know an influence amount of a temperature dependency of a dispersion slope, a method of monitoring a dispersion variation amount in two or more of wavelength channels is provided. Further, a method of compensating a wavelength dependency of a temperature dependency of the dispersion by providing an appropriate dispersion individually to the channels or summarizingly for all of bandwidths based on the monitored dispersion variation amounts is provided. According to the present invention, in the WDM optical transmission system, a deterioration in a transmission characteristic by influence of a temperature variation of the dispersion slope can be reduced.

18 Claims, 13 Drawing Sheets

FOREIGN PATENT DOCUMENTS

| | | |
|---|---|---|
| JP | 10-319265 | 12/1998 |
| JP | 2001-189696 | 7/2001 |
| JP | 2001-339345 | 12/2001 |
| JP | 2002-057622 | 2/2002 |
| JP | 2002-064430 | 2/2002 |
| JP | 2002-77053 | 3/2002 |
| JP | 2003-134047 | 5/2003 |
| WO | WO 01/58057 A1 | 8/2001 |

OTHER PUBLICATIONS

K. Kikuchi, *Highly Sensitive Interferometric Autocorrelator Using Si Avalanche Photodiode as Two-photon Absorber*, Electronics Letters, vol. 34, No. 1, Jan. 8, 1998, pp. 123-125.

Kenji Taira et al., *Optical Sampling System at 1.55 μm for the Measurement of Pulse Waveform and Phase Employing Sonogram Characterization*, IEEE Photonics Technology Letters, vol. 13, No. 5, May 2001, pp. 505-507.

B. J. Eggleton, *Integrated Tunable Fiber Grating for Dispersion Management in High-Bit Rate Systems*, Journal of Lightwave Technology, vol. 18, No. 10, Oct. 200, pp. 1418-1432.

Correction to *Integrated Tunable Fiber Gratings for Dispersion Management in High-Bit Rate Systems*, Journal of Lightwave Technology, U.S., IEEE, vol. 18. No. 11, Nov. 2000, pp. 1591.

T. Inui et al., *Chirp Measurement Technique by Using Two-Photon Absorption*, Proceedings of the IEICE Convention, vol. 2002, Aug. 20, 2002, pp. 409, with English translation.

K. S. Kim et al., *Temperature Dependence of Chromatic Dispersion in Dispersion-Shifted Fibers: Experiment and Analysis*, J. Appl. Phys., vol. 73, No. 5, Mar. 1,1993, pp. 2069-2074.

T. Inue et al., *Adaptive Dispersion Slope Equalizer Using a Nonlinearly Chirped fiber Bragg Grating Pair with a Novel Dispersion Detection Technique*, IEEE Photon. Technol. Letters, vol. 14, No. 4, 2002, pp. 549-551.

H. Ooi et al., *40-Gbit/s WDM Automatic Dispersion Compensation with Virtually Imaged Phased Array (VIPA) Variable Dispersion Compensators*, IEICE Trans. Commun., vol. E85-B, No. 2, 2002, pp. 463-469.

K. Mukasa et al., *Novel Network Fiber to Manage Dispersion at 1.55 μm with Combination of 1.3 μm Zero Dispersion Single Mode Fiber*, ECOC '97, 1997, pp. 127-130.

K. Yonenaga et al., *Dispersion-Compensation-free 40-Gbit/s × 4-channel WDM Transmission Experiment Using Zero-Dispersion-Flattened Transmission Line*, OFC '98, 1998, PD20-1-PD20-4.

E. Yamada et al., *106 Channel × 10 Gbit/s, 640 km DWDM Transmission with 25 GHz Spacing with Supercontinuum Multi-Carrier Source*, Electron. Letters, vol. 37, No. 25, 2001, pp. 1534-1535.

M. Nakazawa et al., *1.28 Tbit/s-70 km OTDM Transmission Using Third- and Fourth-Order Simultaneous dispersion Compensation with a Phase Modulator*, Electron. Letters, vol. 36, No. 24, 2002, pp. 2027-2029.

H. Kawakami et al., *Highly Efficient Distributed Raman Amplification System in a Zero-Dispersion Flattened Transmission Line*, OA&A '99, 1999, ThB5-1/110-ThB5-4/113.

T. Inui et al., *Bit Rate Flexible Chirp Measurement Technique Using Two-photon Absorption*, Electronics Letters, vol. 38, No. 23, Nov. 7, 2002.

K. Takiguchi et al., *Dispersion Slope Equalizer for Dispersion Shifted Fiber Using a Lattice-form Programmable Optical Filter on a Planar Lightwave Circuit*, J. Lightwave Technol., vol. 16, No. 9, 1998, pp. 1647-1656.

M. Jablonski et al., *Adjustable Coupled Two-cavity Allpass Filter for Dispersion Slope Compensation of Optical Fibres*, Electronics Letters, vol. 36, No. 6, 2000, pp. 511-512.

\* cited by examiner

DISPERSION MONITORING METHOD AND APPARATUS AND DISPERSION SLOPE TEMPERATURE DEPENDENCY COMPENSATION METHOD AND APPARATUS

This application claims priority from Japanese Patent Application No. 2002-214575 filed Jul. 23, 2002, which is incorporated hereinto by reference.

BACKGROUND OF THE INVENTION

1. Field of the Invention

The present invention relates to a dispersion monitoring method and apparatus as well as a dispersion slope temperature dependency compensation method and apparatus, more specifically, relates to a method of monitoring a dispersion variation amount on a transmission optical fiber in a wavelength division multiplexing (WDM) optical transmission system and a compensation method of a dispersion of a transmission line.

2. Description of the Related Art

At present, research/development has been promoted on optical communication of high speed/large capacity for carrying a photonic network in the future. In realizing such an optical communication, there is compensation of a dispersion of a transmission line as one of important problems. As shown in FIG. 1, in an optical transmission system, an optical signal (A in the figure) generated from a transmitter 1 is transmitted to a transmission optical fiber 2 and is transmitted to a receiver 5 while being optically amplified by optical repeaters 3 at certain distances. The optical signal immediately after transmission is deteriorated in a waveform thereof by dispersions of the transmission optical fiber 2 and the optical repeaters 3 (B in the figure). When the optical signal is directly received, an error is produced in reading the signal by interference between contiguous optical pulses. Further, the more increased the velocity of the optical signal, the more reduced the 1 time slot (time width occupied by 1 bit) and therefore, the more increased is the influence on a transmission characteristic by a dispersion D (ps/nm). Therefore, there is a demand for a dispersion compensation means 4 for compensating the dispersion of the transmission line (transmission optical fiber and optical repeater).

What poses a problem here is that a dispersion of the transmission optical fiber is varied by temperature. In the case of a 1.3 μm zero dispersion fiber (single mode fiber: SMF) or a dispersion-shifted fiber, it is known that the dispersion is changed by the following equation by shifting a zero dispersion wavelength by a temperature change $\Delta T$(deg) (K. S. Kim and M. E. Lines, "Temperature dependence of chromatic dispersion in dispersion-shifted fibers: Experiment and analysis", J. Appl. Phys., Vol. 73, No. 5, pp. 2069-2074, 1993).

$$\Delta D = Z \cdot S \cdot L \cdot \Delta T \quad (1)$$

where $\Delta D$(ps/nm) designates a dispersion change amount, $Z$(nm/deg) designates a temperature constant of zero dispersion wavelength shift, $S$(ps/nm$^2$/km) designates a dispersion slope (wavelength differential of dispersion) and $L$(km) designates an optical fiber length.

Heretofore, a variation amount of the dispersion by the temperature change has been regarded as constant without depending on the wavelength. Therefore, according to an adaptive dispersion equalization technology which has been proposed until present time, the variation of the dispersion is equalized among respective channels by the same amount (T. Inui et al. "Adaptive dispersion slope equalizer using a non-linearly chirped fiber Bragg grating pair with a novel dispersion detection technique", IEEE Photon. Technol. Lett., vol. 14, no. 4, P. 549 (2002), H. Ooi et al., "40-Gbit/s WDM automatic dispersion compensation with virtually imaged phased array (VIPA) variable dispersion compensators", IEICE Trans. Commun., vol. E85-B, no. 2, p. 463 (2002)).

A reverse dispersion fiber (RDF) which has been developed recently (K. Mukasa et. al., "Novel network fiber to manage dispersion at 1.55 μm with combination of 1.3 μm zero dispersion single mode fiber", ECOC'97, 1, p. 127 (1997)) is a fiber in which a dispersion/a dispersion slope are provided with signs reverse to the sign of the 1.3 μm zero dispersion optical fiber (single mode fiber: SMF) and absolute values thereof are near to those of SMF. By combining RDF with SMF, a transmission line in which both of dispersion and dispersion slope are near to zero can be realized. Therefore, a transmission line combined with SMF and RDF is used in WDM transmission (K. Yonenaga et al., "Dispersion-compensation-free 40 Gbit/s×4-channel WDM transmission experiment using zero-dispersion flattened transmission line", OFC'98, PD20 (1998), E. Yamada et al., "106 channel×10 Gbit/s, 640 km DWDM transmission with 25 GHz spacing with supercontinuum multi-carrier source", Electron. Lett., vol. 37, p. 1534 (2001)), and in ultra high speed OTDM transmission (M. Nakazawa et al., "1.28 Tbit/s−70 km OTDM transmission using third- and fourth-order simultaneous dispersion compensation with a phase modulator", Electron Lett., vol. 36, p. 2027 (2000)). Further, RDF is utilized not simply as a transmission medium but a fiber for Raman amplification by utilizing the fact that a core diameter thereof is smaller than that of SMF or a dispersion-shifted fiber (H. Kawakami et al., "Highly efficient distributed Raman amplification system in a zero-dispersion flattened transmission line", OA&A'99, ThB5 (1999), E. Yamada et al., "106 channel×10 Gbit/s, 640 km DWDM transmission with 25 GHz spacing with supercontinuum multi-carrier source", Electron Lett., vol. 37, p. 1534 (2001)).

Although it has been known that the dispersion of the optical fiber is provided with temperature dependency, the temperature dependency of the dispersion slope has not been investigated. However, it has been known that a fiber having negative dispersion/dispersion slope as in RDF is provided with temperature dependency of the dispersion slope, that is, the wavelength dependency of the temperature dependency of the dispersion which cannot be disregarded. When a high speed/wide bandwidth WDM transmission line is constructed by SMF and RDF without taking the characteristic into consideration, a dispersion having a different value among channels is produced by temperature change exceeding an allowable dispersion value depending on channels.

<Temperature Dependency of Dispersion Slope of RDF>

FIG. 2A and FIG. 2B schematically show respective dispersion curves (dispersion vs wavelength) of SMF and RDF. In the case of the fiber having a negative dispersion slope of a dispersion as in RDF, structural dispersion is adjusted by devising a refractive index profile and dispersion on a side of a long wavelength is increased in a negative direction. Therefore, when dispersion vs wavelength of the fiber is plotted, whereas dispersion vs wavelength of SMF substantially becomes a linear line, that of RDF becomes a line having a radius of curvature. This can be expressed also as an absolute value of a quartic dispersion (wavelength differential of dispersion slope) is larger than that of SMF.

In this case, when changes of dispersions at wavelengths $\lambda_1$ and $\lambda_2$ in the case of changing temperature of the fiber from $T_1$ to $T_2$ are observed, when the dispersion curves are shifted by temperature change, in the case of SMF of FIG. 2A, magnitudes of change amounts $\Delta D_{1SMF}$ and $\Delta D_{2SMF}$ at $\lambda_1$ and $\lambda_2$ are almost the same. In contrast thereto, in the case of a fiber having a dispersion characteristic having a radius of curvature as in RDF, as shown in FIG. 2B, magnitudes of change amounts $\Delta D_1 RDF$ and $\Delta D_2 RDF$ at $\lambda_1$ and $\lambda_2$ are clearly different from each other. The fact represents that the wavelength dependency which cannot be disregarded is present in the temperature dependency of the dispersion of RDF (the fact may be regarded as the dispersion slope of RDF is provided with temperature dependency).

FIG. 3 shows curves produced by measuring temperature dependency constants of dispersions with regard to SMF and RDF and the temperature dependency constants are plotted with respect to four wavelengths. An inclination of a linear line produced by connecting the four points becomes equivalent to temperature dependency constants of the dispersion slopes. Whereas the value is $1.79 \times 10^{-6}$ ps/km/nm²/deg for SMF, the value for RDF is $1.48 \times 10^{-5}$ ps/km/nm²/deg which is larger than the value of SMF by one order of magnitude.

<Influence Effected by Temperature Dependency of Dispersion Slope>

When a wavelength bandwidth of an optical signal in an optical transmission system is defined as $\Delta\lambda$(nm) and a temperature dependency constant and a length of a dispersion slope of a transmission optical fiber are defined respectively as $\alpha_T$(ps/nm²/km/deg) and L(km) and a temperature variation is defined as $\Delta T$(deg), a dispersion change amount difference $\Delta D$(ps/nm) is represented by the following equation.

$$\Delta D = \alpha_T \cdot L \cdot \Delta T \cdot \Delta\lambda \quad (2)$$

Therefore, for example, when a transmission line is provided with a value $\alpha_T = 1.48 \times 10^{-5}$ (ps/nm²/km/deg) similar to that of RDF and the optical fiber length is set to L=1000 (km), the temperature change is set to $\Delta T$=50 (deg) and the wavelength bandwidth is set to $\Delta\lambda$=100 (nm), the dispersion change amount difference becomes $\Delta D$=74.0 (ps/nm). That is, even when the dispersion is set to 0 in a total range of the wavelength bandwidth of 100 nm at an initial time of operating a WDM transmission system and a variation amount of the dispersion is compensated by an adaptive type dispersion equalizer by the same amount over a total wavelength bandwidth, by the temperature dependency of the dispersion slope, a difference of a dispersion of 62.5 (ps/nm) is produced between channels of the shortest wavelength and the longest wavelength. In this case, application to a WDM transmission system (allowable dispersion of about 40 ps/nm) of 40 Gbit/s/ch becomes difficult.

As described above, a dispersion of a value which differs among channels is produced by a temperature change in WDM transmission of high speed/wide bandwidth by the temperature dependency of the dispersion slope provided to the optical fiber. Therefore, even when the variation amount of the dispersion is compensated by the adaptive type dispersion equalizer by the same amount over a total wavelength bandwidth, there poses a problem that the variation amount exceeds the allowable dispersion value depending on channels.

SUMMARY OF THE INVENTION

It is an object of the invention to monitor and compensate a wavelength dependency of a temperature dependency of a dispersion, in other words, a temperature dependency of a dispersion slope in a WDM optical transmission system.

According to a first aspect of the invention, in a dispersion monitoring method according to the invention, there is provided a method of monitoring a dispersion on a transmission optical fiber in a wavelength division multiplexing optical transmission system, the method comprising the steps of extracting two or more of wavelength channels 1 to n from the transmission optical fiber and monitoring dispersions of the extracted wavelength channels.

Here, the step of monitoring the dispersions can include the steps of measuring a first dispersion value in the extracted wavelength channels 1 to n (wavelength:$\lambda_{mon1}$ to $\lambda_{monn}$) at a certain temperature $T_1$(° C.), measuring a second dispersion value in the wavelength channels 1 to n at a certain other temperature $T_2$(° C.), providing dispersion variation amounts $\Delta D_{mon1}$ to $\Delta D_{monn}$ in the extracted wavelength channels 1 to n from a difference between the measured first dispersion value and the measured second dispersion value, and a step of providing a dispersion variation amount at an arbitrary wavelength ($\lambda$) based on the provided dispersion variation amounts $\Delta D_{mon1}$ to $\Delta D_{monn}$.

Here, the n may be 2 and the step of providing the dispersion variation amount can calculate a dispersion variation amount $\Delta D(\lambda)$ in an arbitrary wavelength ($\lambda$) by the following equation.

$$\Delta D(\lambda) = \frac{\Delta D_{mon2} - \Delta D_{mon1}}{\lambda_{mon2} - \lambda_{mon2}} \cdot (\lambda - \lambda_{mon1}) + \Delta D_{mon1}$$

Further, the step of monitoring the dispersions can include the steps of measuring a first dispersion value in a desired wavelength channel at a certain temperature $T_1$(° C.), measuring a second dispersion value in the desired wavelength channel at a certain other temperature $T_2$(° C.), and a step of providing a dispersion variation amount in the desired wavelength channel from a difference between the measured first dispersion and the measured second dispersion value.

According to a second aspect of the invention, in a dispersion slope temperature dependency compensating method according to the invention, there is provided a method of compensating a temperature dependency of a dispersion slope in a wavelength division multiplexing optical transmission system, the method comprising the steps of providing the dispersion variation amount $\Delta D(\lambda)$ by the above-described method and compensating the temperature dependency of the dispersion slope by using the provided dispersion variation amount $\Delta D(\lambda)$.

Here, the step of compensating the temperature dependency of the dispersion slope can include the steps of dividing a signal light on the transmission optical fiber to one or more wavelength channel groups constituted by at least one wavelength channel, and compensating the dispersion in accordance with each of the divided one or more wavelength channel groups.

Further, the step of compensating the dispersion can be carried out by using one or more tunable dispersion equalizers with a fiber Bragg grating.

Further, the step of compensating the dispersion can be carried out by using one or more tunable dispersion equalizers with a filter.

Further, the step of compensating the temperature dependency of the dispersion slope can summarizingly compensate a wavelength dependency of the temperature dependency of the dispersion in all of bandwidths in a wavelength division multiplexing optical transmission system.

Further, the step of compensating the temperature dependency of the dispersion slope can be carried out by using one or more tunable dispersion equalizers with a fiber Bragg grating.

Further, the step of compensating the temperature dependency of the dispersion slope can include the step of providing a temperature change in a dispersion compensating optical fiber installed at an optical node.

According to a third aspect of the invention, in a dispersion monitoring apparatus according to the invention, there is provided a dispersion monitoring apparatus for monitoring a dispersion on a transmission optical fiber in a wavelength division multiplexing optical transmission system, the dispersion monitoring apparatus comprising extracting means for extracting two or more of wavelength channels from the transmission optical fiber and monitoring means for monitoring dispersions of the extracted wavelength channels.

According to a fourth aspect of the invention, in a dispersion slope temperature dependency compensating apparatus according to the invention, there is provided a dispersion slope temperature dependency compensating apparatus for compensating a temperature dependency of a dispersion slope in a wavelength division multiplexing optical transmission system, the dispersion slope temperature dependency compensating apparatus comprising monitoring means for monitoring dispersions of two or more of wavelength channels on a transmission optical fiber, and compensating means for compensating a wavelength dependency of the temperature dependency of the dispersion in an arbitrary wavelength channel by using the monitored dispersions.

Here, the compensating means can include means for dividing a signal light on the transmission optical fiber into one or more wavelength channel groups constituted by at least one wavelength channel, and means for compensating the dispersion in accordance with each of the divided one or more wavelength channel groups.

Further, the compensating means can include one or more tunable dispersion equalizers with a fiber Bragg grating.

Further, the compensating means can include one or more tunable dispersion equalizers with a filter.

Further, the compensating means can summarizingly compensate the wavelength dependency of the temperature dependency of the dispersion in all of bandwidths in a wavelength division multiplexing optical transmission system.

Further, the compensating means can include one or more tunable equalizers with a fiber Bragg grating.

Further, the compensating means can include a dispersion compensating optical fiber installed in an optical node, and means for providing a temperature change to the dispersion compensating optical fiber.

According to the invention, a wavelength division multiplexing optical transmission system without a deterioration in a transmission characteristic by an influence of a temperature dependency of a dispersion slope can be realized.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
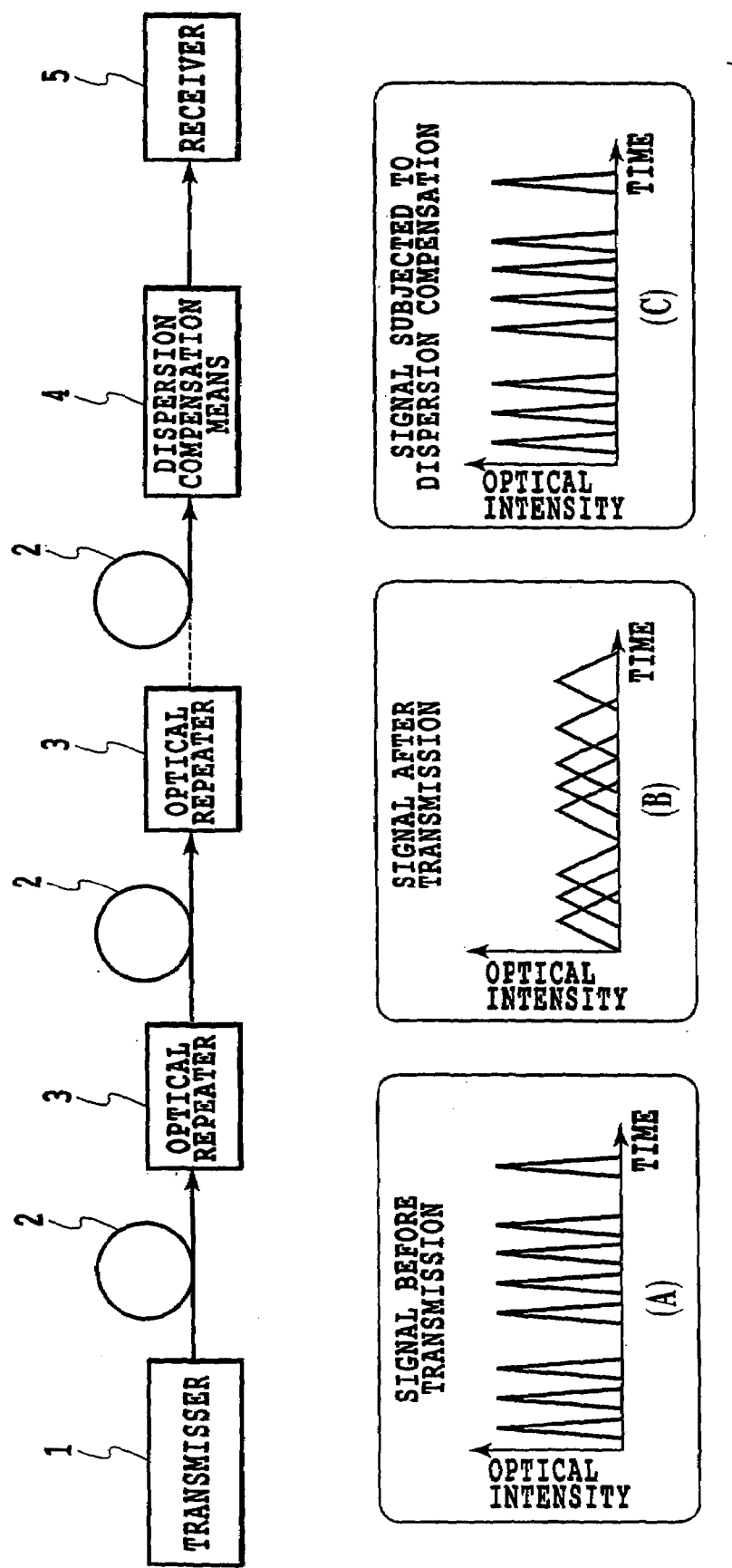
FIG. 1 illustrates an outline view of an optical transmission system.
Figure 2B:
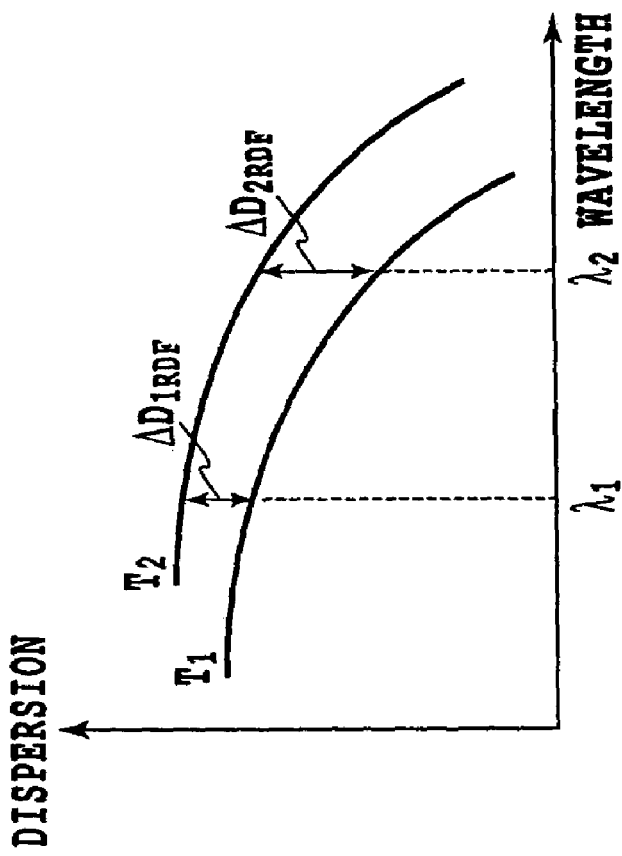
FIG. 2A and FIG. 2B illustrate schematic views showing temperature dependencies of wavelength dependencies of dispersions of SMF and RDF.
Figure 2A:
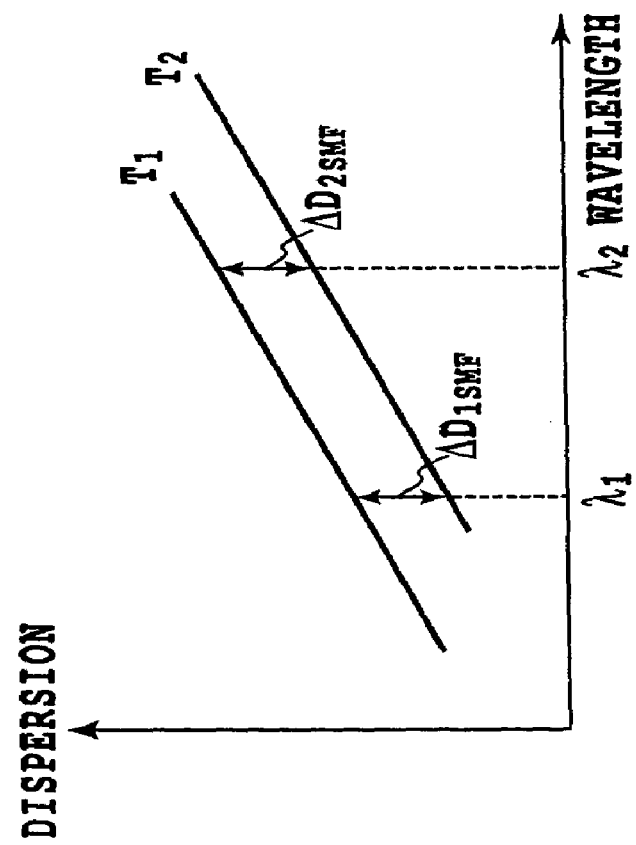
Figure 3:
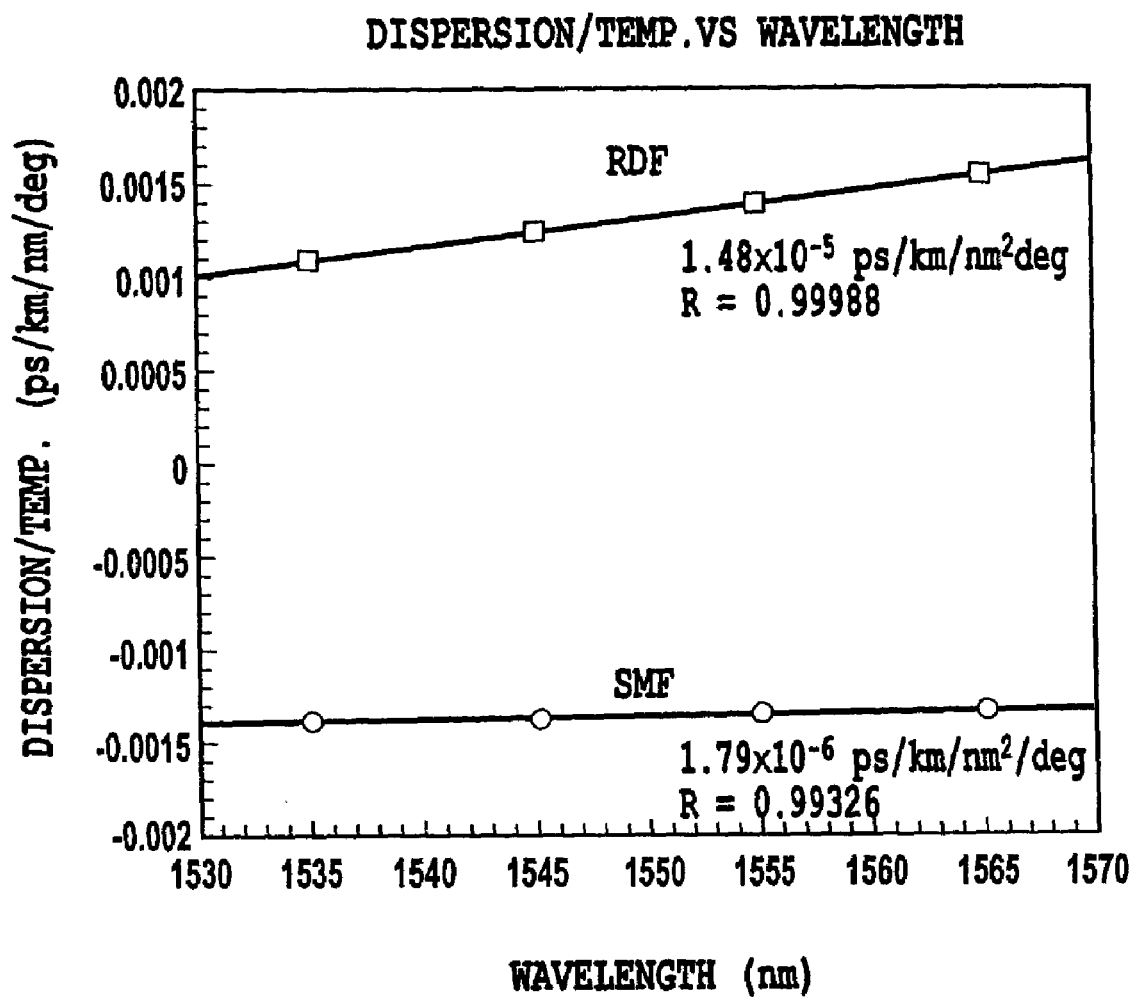
FIG. 3 illustrates a diagram showing wavelength dependencies of temperature dependency constants of dispersions of SMF and RDF.
Figure 4:
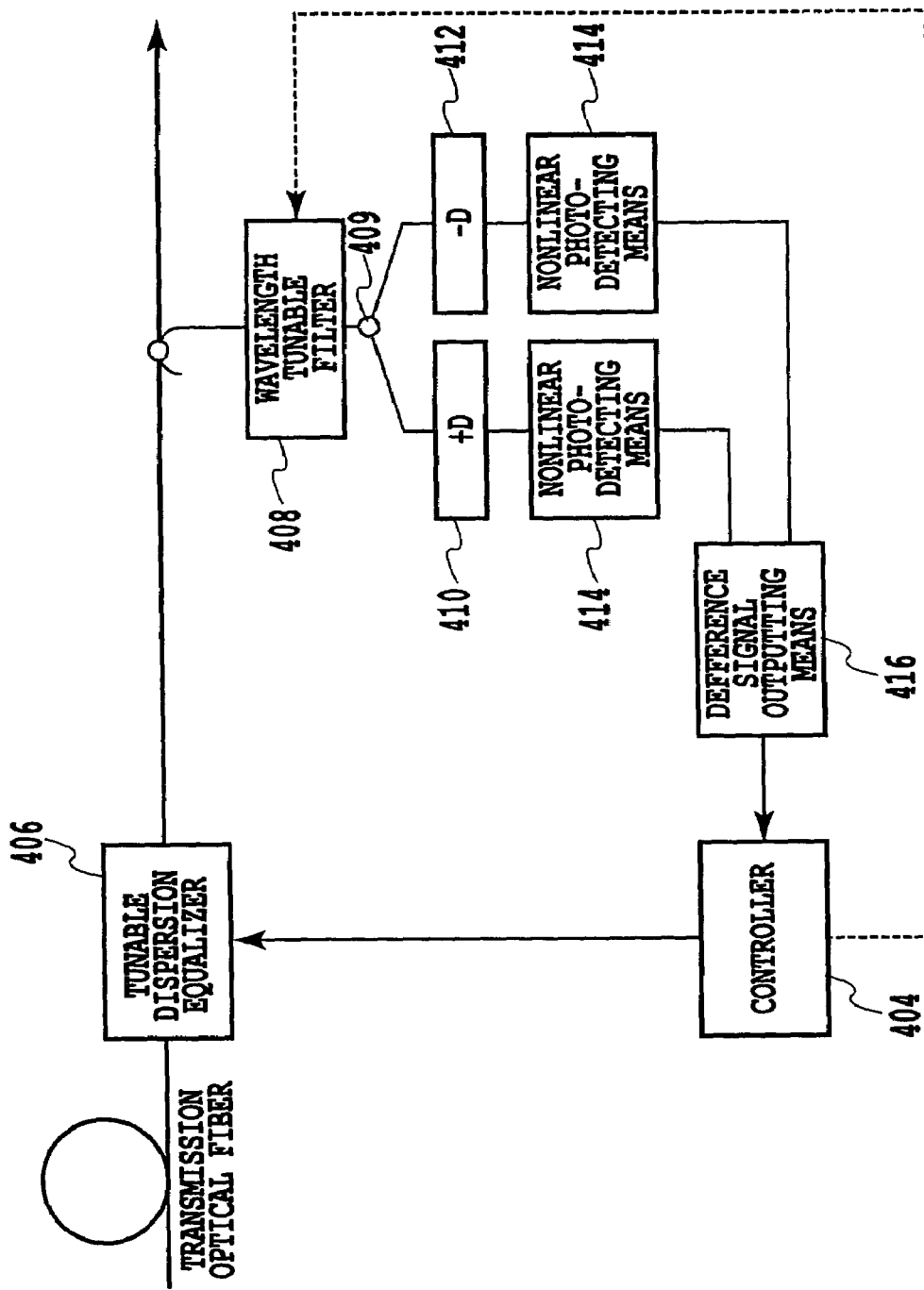
FIG. 4 illustrates a view showing an exemplified apparatus constitution of a dispersion slope temperature dependency compensating apparatus.

FIG. 4 shows an apparatus constitution of a dispersion slope temperature dependency compensating apparatus for monitoring and compensating a dispersion variation amount of a transmission optical fiber in a WDM optical transmission system. Here, as a means for realizing a dispersion variation amount monitoring method, there is used a dispersion detection apparatus described in, for example, Japanese Patent Application No. 2002-164437, U.S. Patent Application Publication No. US2003/0086713 A1, EU Patent Application Publication No. 1309115 and T. Inui, K. R. Tamura, K. Mori and T. Morioka, "Bit rate flexible chirp measurement technique using two-photon absorption", Electronics Letters, vol. 38, no. 23, 7 Nov. 2002.

The dispersion slope temperature dependency compensating apparatus includes a dispersion detection apparatus and a tunable dispersion equalizer 406. The dispersion detection apparatus includes a wavelength tunable filter 408, an optical coupler 409, dispersive media 410 and 412, nonlinear photo-detecting means 414, a difference signal outputting means 416 and a controller 404. The wavelength tunable filter 408 is constituted to be able to set a wavelength of light to be picked up. The dispersion media 410 and 412 use media having the same absolute value D of a dispersion value and signs different from each other. The nonlinear photo-detecting means 414 outputs a voltage in proportion to a square of an intensity of light. The difference signal outputting means 416 detects a difference between output voltages of the nonlinear photo-detecting means 414 and outputs a difference signal (voltage difference).

In order to know an influence amount of temperature dependency of a dispersion slope, dispersion variations of two channels are monitored. For example, by controlling the wavelength tunable filter 408 by the controller 404 comprising PC (personal computer) of the dispersion detection apparatus while setting a center wavelength thereof to extract a monitor channel 1($\lambda_{mon1}$), a dispersion value in $\lambda_{mon1}$ at a certain temperature $T_1$(° C.) is measured. Light having a wavelength $\lambda_{mon1}$ which has passed the wavelength tunable filter 408 is branched at the optical coupler 409 and inputted to the dispersion media 410 and 412. Light which has passed the dispersion medium 410 is broadened in a pulse width thereof, light which has passed the dispersion medium 412 is reduced in a pulse width thereof and these are inputted to the nonlinear photo-detecting means 414. The difference signal outputting means 416 calculates a dispersion value from a difference between outputs of the two nonlinear photo-detecting means 414 and stores the dispersion value to the controller 404.

Similarly, the center wavelength of the wavelength tunable filter 408 is set to extract a monitor channel 2 ($\lambda_{mon2}$), a dispersion value in $\lambda_{mon2}$ at $T_1$(° C.) is measured and the dispersion value is stored to the controller 404.

Next, the dispersion detection apparatus measures a dispersion value in $\lambda_{mon1}$ when there is a change in environment (temperature change) to change from the temperature $T_1$(° C.) to a certain temperature $T_2$(° C.), and outputs the dispersion value to the controller 404. The controller 404 calculates a difference between the dispersion value in $\lambda_{mon1}$ at temperature $T_1$(° C.) and the dispersion value in $\lambda_{mon1}$ at $T_2$(° C.) to provide a dispersion variation amount $\Delta D_{mon1}$.

Similarly, measurement of a dispersion value $T_2$(° C.) in $\lambda_{mon2}$ is carried out. Then, a dispersion variation amount $\Delta D_{mon2}$ in $\lambda_{mon2}$ is derived from a difference between the dispersion value at temperature $T_2$(° C.) and the dispersion value at temperature $T_1$(° C.).

Figure 5:
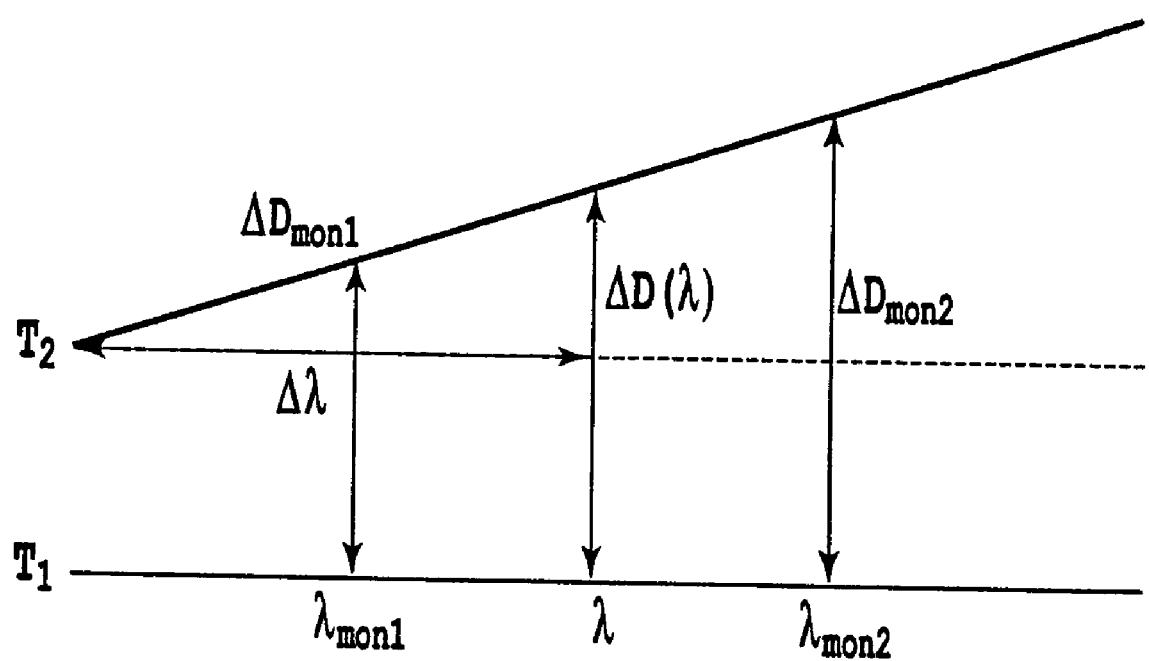
FIG. 5 illustrates a diagram showing a method of calculating a dispersion variation amount at a certain wavelength.

As shown in FIG. 5, when the dispersion variation amount at the monitor channel 1($\lambda_{mon1}$) is $\Delta D_{mon1}$ and the dispersion variation amount at the monitor channel 2($\lambda_{mon2}$) is $\Delta D_{mon2}$, a dispersion variation amount $\Delta D(\lambda)$ in an arbitrary wavelength $\lambda$ is estimated as follows. (the dispersion variation amount $\Delta D(\lambda)$ is approximated to a linear line since linearity of dispersion slope temperature dependency of RDF is highly excellent as indicated by R=0.99988).

$$\Delta D(\lambda) = \frac{\Delta D_{mon2} - \Delta D_{mon1}}{\lambda_{mon2} - \lambda_{mon1}} \cdot (\lambda - \lambda_{mon1}) + \Delta D_{mon1} \quad (3)$$

From a result of the calculation, adaptive dispersion equalization is carried out by controlling the tunable dispersion equalizer 406 by the controller 404 to provide an appropriate dispersion compensation amount in WDM channel.

When the dispersion is monitored more finely, or when the dispersion slope temperature dependency of the transmission optical fiber cannot be approximated by a linear line, there may be constructed a constitution in which the dispersion is monitored in wavelength channels of a number larger than two and appropriate dispersion compensation amounts are provided to respective channels.

First Embodiment

Figure 6:
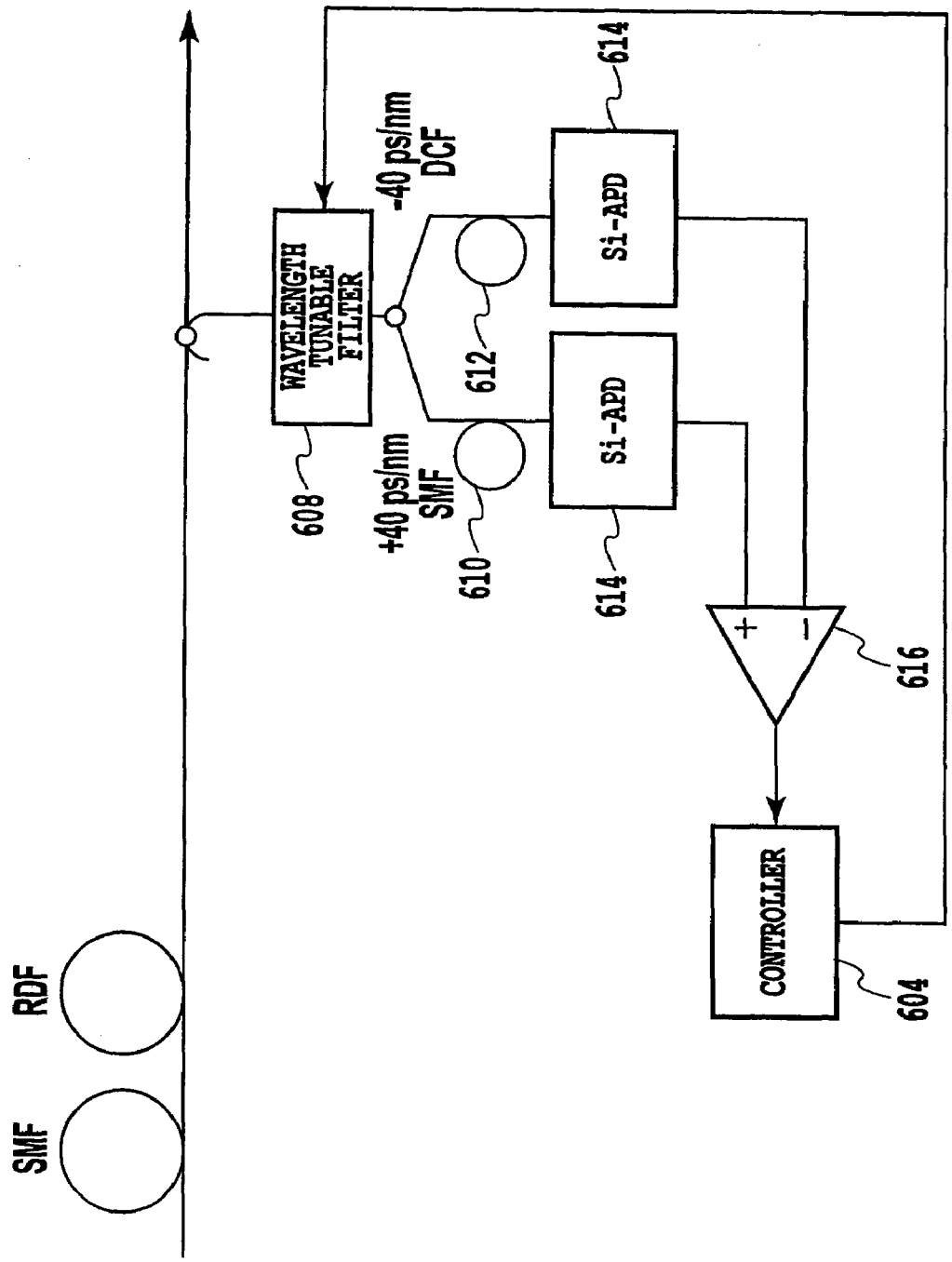
FIG. 6 illustrates a view showing an apparatus constitution of a dispersion monitoring apparatus according to a first embodiment of the invention.

FIG. 6 shows a first embodiment of the invention. In a transmission line in which a transmission optical fiber of a wavelength division multiplexing optical transmission system having a transmission rate of 40 Gbit/s is constituted by SMF and RDF, there is constructed a constitution of using a dispersion detection apparatus described as a dispersion variation amount monitoring method in T. Inui, K. R. Tamura, K. Mori and T. Morioka, "Bit rate flexible chirp measurement technique using two-photon absorption", Electronics Letters, vol. 38, no. 23, 7 Nov. 2002. As dispersion media of a dispersion monitoring apparatus, SMF 610 having a dispersion value of 40 ps/nm and a dispersion compensating fiber (DCF) 612 having a dispersion value of −40 ps/nm are used, and as nonlinear photo-detecting means, a silicon avalanche photodiode (Si-APD) 614 showing two-photon absorption at 1.5 µm band is used. In order that dispersion values of the dispersion media are constant regardless of a wavelength, it is preferable that the optical fiber is of a dispersion flattened type. A cut-off frequency of Si-APD 614 sufficiently smaller than the transmission rate is used. Thereby, direct current voltage can be provided as an output. For example, an Si-APD having a cut-off frequency of 10 MHz is used relative to the transmission rate of 40 Gbit/s. Here, fiber Bragg gratings can be utilized as dispersion media and SHG (second harmonic generation) crystals can be utilized as non linear photo-detecting means.

A differential amplifier 616 detects a difference between output voltages of Si-APDs 614 of the two paths and outputs a difference signal (voltage difference). The difference signal shows a value in accordance with a magnitude of the dispersion (chirp) and therefore, the difference signal can detects and measures the dispersion of the transmission optical fiber.

In order to measure temperature dependency of a dispersion slope of the transmission optical fiber, dispersion variations of two channels in a WDM signal are monitored. A wavelength tunable filter 608 is installed before a branch to the two paths in the dispersion detection apparatus, the filter is controlled by a controller 604 comprising PC (personal computer) and a center wavelength thereof is set to extract a monitor channel 1 ($\lambda_{mon1}$) Further, a dispersion value in $\lambda_{mon1}$ at a certain temperature $T_1$(° C.) is measured and the dispersion value is stored to the controller 604. Similarly, the center wavelength of the wavelength tunable filter is set to extract a monitor channel 2($\lambda_{mon2}$), a dispersion value $\lambda_{mon2}$ at $T_1$(° C.) is measured and the dispersion value is stored to the controller 604.

Next, a dispersion value in $\lambda_{mon1}$ when there is a change in temperature to constitute a certain temperature $T_2$(° C.) is measured and a dispersion variation amount $\Delta D_{mon2}$ in $\lambda_{mon1}$ is derived from a difference from a dispersion value at temperature $T_1$(° C.). Similarly, measurement of a dispersion value at $T_2$(° C.) in $\lambda_{mon2}$ is carried out. Then, a dispersion variation amount $\Delta D_{mon2}$ in $\lambda_{mon2}$ is derived from a difference between the dispersion value at temperature $T_2$(° C.) and the dispersion value at temperature $T_1$(° C.).

When the dispersion slope temperature dependency of the transmission optical fiber can be approximated by a linear line, a dispersion variation amount $\Delta D(\lambda)$ in a certain arbitrary wavelength ($\lambda$) is represented as follows and therefore, the dispersion variation amounts, that is, dispersion amounts to be compensated in respective wavelength channels are known from the equation.

$$\Delta D(\lambda) = \frac{\Delta D_{mon2} - \Delta D_{mon1}}{\lambda_{mon2} - \lambda_{mon1}} \cdot (\lambda - \lambda_{mon1}) + \Delta D_{mon1} \quad (3)$$

Second Embodiment

In a transmission line in which a transmission optical fiber of a wavelength division multiplexing optical transmission system is constituted by SMF and RDF, there is constructed a constitution of using a dispersion detection apparatus described as a dispersion variation amount monitoring method in T. Inui, K. R. Tamura, K. Mori and T. Morioka, "Bit rate flexible chirp measurement technique using two-photon absorption", Electronic Letters, vol. 38, no. 23., 7 Nov. 2002, similar to the first embodiment shown in FIG. 6.

Center wavelengths of a wavelength tunable filter are set one by one for all of wavelength channels by the controller 604 comprising PC (personal computer) and dispersion values are monitored. For example, in a wavelength division multiplexing optical transmission system comprising 32 channels, dispersion values in wavelength channels 1 to 32 ($\lambda_{mon1}$ to $\lambda_{mon32}$) at a certain temperature $T_1(° C.)$ are measured and the dispersion values are stored to the controller 604. Next, by measuring dispersion values in $\lambda_{mon1}$ to $\lambda_{mon32}$ when a certain other temperature $T_2(° C.)$ is constituted, dispersion variation amounts $\Delta D_{mon1}$ to $\Delta D_{mon32}$ in all of the wavelength channels $\lambda_{mon1}$ to $\lambda_{mon32}$ can be monitored by differences from the dispersion values at temperature $T_1(° C.)$ for the respective wavelength channels. By monitoring the dispersion variation amounts of the respective channels, appropriate dispersion compensation amounts in the respective channels can be known.

Third Embodiment

In a transmission line in which a transmission optical fiber of a wavelength division multiplexing optical transmission system is constituted by SMF and RDF, there is constructed a constitution of using a dispersion detecting apparatus described as a dispersion variation amount monitoring method in T. Inui, K. R. Tamura, K. Mori and T. Morioka, "Bit rate flexible chirp measurement technique using two-photon absorption", Electronic Letters, vol. 38, no. 23, 7 Nov. 2002, similar to the first embodiment shown in FIG. 6.

Center wavelengths of a wavelength tunable filter are set one by one for a plurality of wavelength channels by the controller 604 comprising PC (personal computer) and dispersion values are monitored. For example, in a wavelength division multiplexing optical transmission system comprising 128 channels, dispersion values in monitor channels 1 to 32 ($\lambda_{mon1}$ to $\lambda_{mon32}$) at certain intervals (at intervals of 4 channels in this case) at a certain temperature $T_1(° C.)$ are measured and the dispersion values are stored to the controller 604. Next, by measuring dispersion values in $\lambda_{mon1}$ to $\lambda_{mon32}$ when a certain other temperature $T_2(° C.)$ is constituted, dispersion variation amounts $\Delta D_{mon1}$, to $\Delta D_{mon32}$ in wavelength channels of $\lambda_{mon1}$ to $\lambda_{mon32}$ at intervals of 4 channels are monitored from differences from the dispersion values at temperature $T_1(° C.)$. There is constructed a constitution of calculating a dispersion variation amount $\Delta D(\lambda)$ at a certain arbitrary wavelength ($\lambda$) by plotting values of the dispersion variation amounts on a graph and providing an approximated curve thereof by, for example, a least squares method.

The dispersion variation monitoring method can deal with also a case in which the dispersion slope temperature dependency of the transmission optical fiber cannot be approximated by a linear line.

Fourth Embodiment

Figure 7:
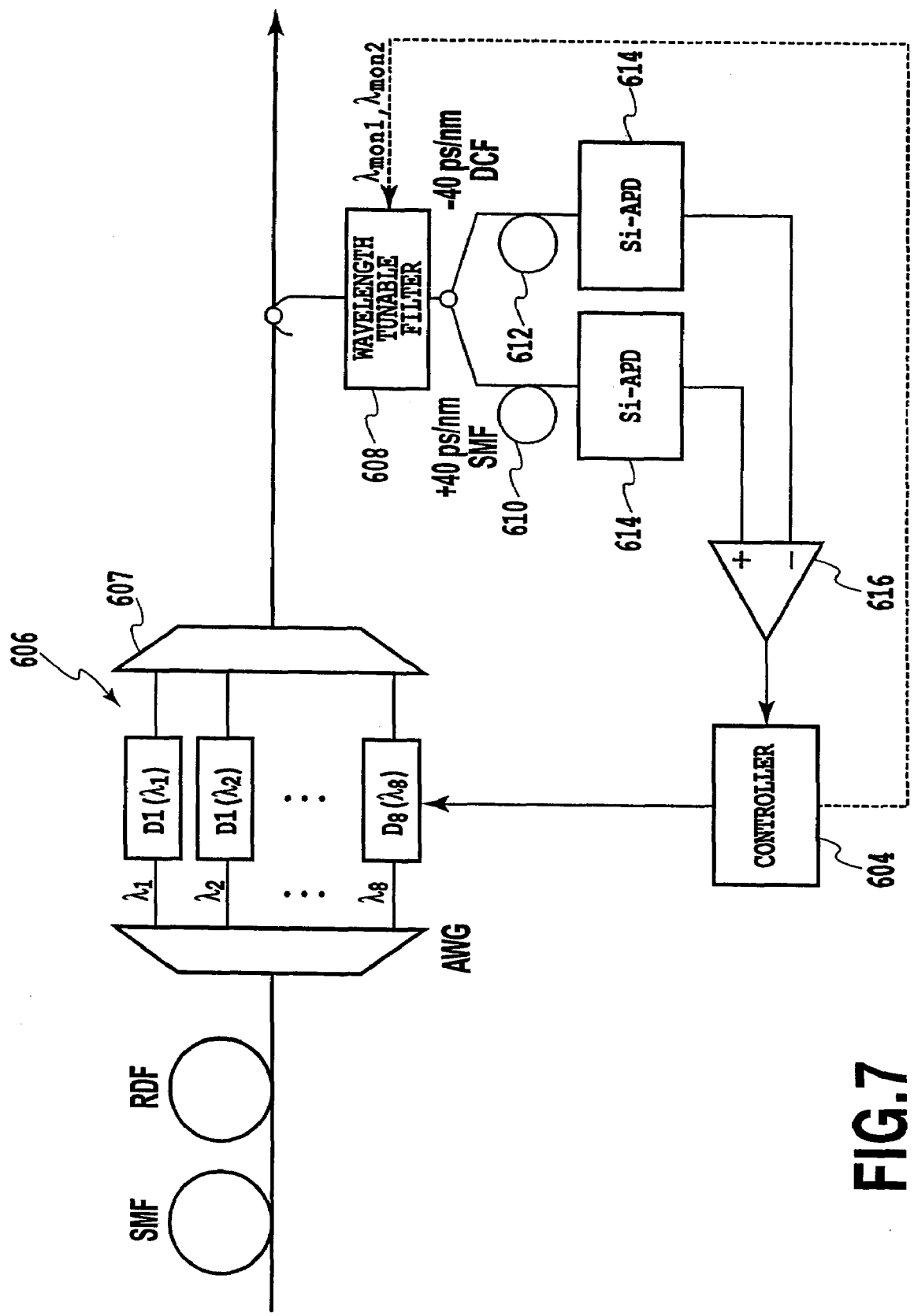
FIG. 7 illustrates a view showing an apparatus constitution of a dispersion slope temperature dependency compensating apparatus according to a fourth embodiment of the invention.

FIG. 7 shows a fourth embodiment of the invention. In a 40 Gbit/s WDM optical transmission system, in which a transmission optical fiber is constituted by SMF and RDF, there is constructed a constitution of using a dispersion detection apparatus described as a dispersion variation amount monitoring method in T. Inui, K. R. Tamura, K. Mori and T. Morioka, "Bit rate flexible chirp measurement technique using two-photon absorption", Electronics Letters, vol. 38, no. 23, 7 Nov. 2002. As dispersion media of a dispersion monitoring apparatus, SMF 610 having a dispersion value of 40 ps/nm and a dispersion compensating fiber (DCF) 612 having a dispersion value of −40 ps/nm are used and as nonlinear photo-detecting means, a silicon avalanche photodiode (Si-APD) 614 showing two-photon absorption at 1.5 µm band is used. In order that dispersion values of the dispersion media are constant regardless of a wavelength, it is preferable that the optical fiber is of a dispersion flattened type. A cut-off frequency of Si-APD 614 sufficiently smaller than a transmission rate is used. Thereby, direct current voltage can be provided as an output. For example, Si-APD having a cut-off frequency of 10 MHz is used relative to a transmission rate of 40 Gbit/s.

The differential amplifier 616 outputs a difference signal (voltage difference) by detecting a difference between output voltages of Si-APDs 614 of the two paths. The difference signal shows a value in accordance with a magnitude of dispersion (chirp) and therefore, a dispersion of the transmission optical fiber can be detected and measured. Dispersion compensation can be carried out by controlling the tunable dispersion equalizer 606 in the controller 604 comprising PC (personal computer) by using the difference signal.

In order to measure temperature dependency of a dispersion slope of the transmission optical fiber, dispersion variation amounts of two channels in a WDM signal are monitored. The wavelength tunable filter 608 is installed before a branch to the two paths in the dispersion detection apparatus and a center wavelength thereof is set to extract a monitor channel 1($\lambda_{mon1}$) by controlling a filter by the controller 604. Further, a dispersion value in $\lambda_{mon1}$ at a certain temperature $T_1(° C.)$ is measured and a dispersion value is stored to the controller 604. Similarly, the center wavelength of the wavelength tunable filter is set to extract a monitor channel 2($\lambda_{mon2}$), a dispersion value in $\lambda_{mon2}$ at $T_1(° C.)$ is measured and the dispersion value is stored to the controller 604.

Next, when there is a change in environment (temperature change) to change from the temperature $T_1(° C.)$ to a certain temperature $T_2(° C.)$, a dispersion value in $\lambda_{mon1}$ is measured and a dispersion variation amount $\Delta D_{mon1}$ in $\lambda_{mon1}$ is derived from a difference from the dispersion value at temperature $T_1(° C.)$. Similarly, measurement of a dispersion value at $T_2(° C.)$ in $\lambda_{mon2}$ is carried out. Then, a dispersion variation amount $\Delta D_{mon2}$ in $\lambda_{mon2}$ is derived from a difference between the dispersion value at temperature $T_2(° C.)$ and the dispersion value at temperature $T_1(° C.)$.

When the dispersion slope temperature dependency of the transmission optical fiber can be approximated by a linear line, a dispersion variation amount $\Delta D(\lambda)$ in a certain arbitrary wavelength ($\lambda$) is represented as follows and therefore, dispersion variation amounts, that is, dispersion amounts to be compensated in respective wavelength channels are known from the equation.

$$\Delta D(\lambda) = \frac{\Delta D_{mon2} - \Delta D_{mon1}}{\lambda_{mon2} - \lambda_{mon1}} \cdot (\lambda - \lambda_{mon1}) + \Delta D_{mon1} \quad (3)$$

Figure 8:
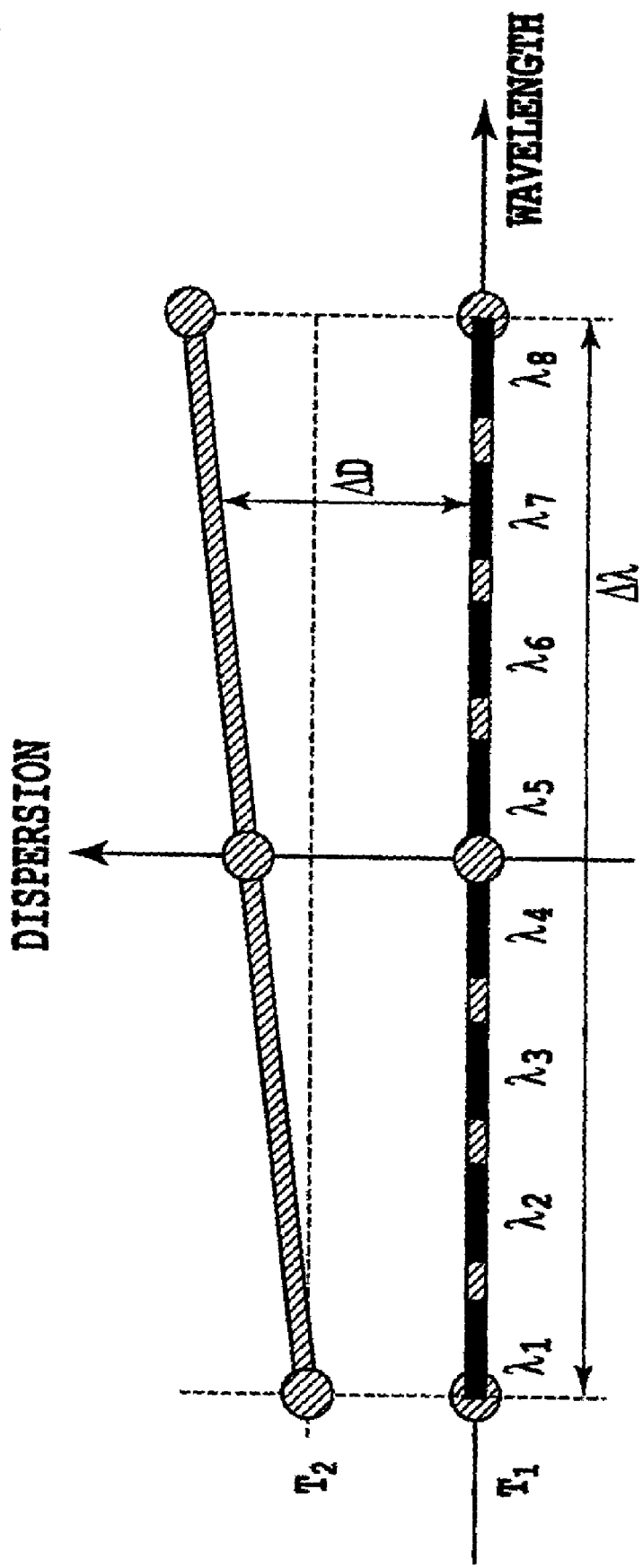
FIG. 8 illustrates a diagram for explaining an individual dispersion compensating method of respective channels.

An optical signal transmitted through the transmission optical fiber is branched to respective wavelength channels by an arrayed waveguide grating (AWG) 607 and inputted to the tunable dispersion equalizer 606. Further, dispersion variation amounts in accordance with respective channels derived from the above-described calculation are compensated by controlling a tunable dispersion equalizer 606 by the controller 604. The tunable dispersion equalizer 606 in which a dispersion of a chirped fiber Bragg grating is made variable by using a heater can be used. When this is illustrated, as shown by FIG. 8, by compensating a dispersion produced by a temperature change by the tunable dispersion equalizer 606 for respective channels, temperature dependency of the dispersion slope can be compensated.

Fifth Embodiment

The optical signal transmitted to the transmission optical fiber may be divided into one or more wavelength channel groups constituted by a plurality of wavelength channels by an arrayed waveguide grating (AWG). In this case in a constitution shown in FIG. 7, the optical signal transmitted through the transmission optical fiber is divided into the one or more wavelength channel groups constituted by the plurality of wavelength channels by the arrayed waveguide grading (AWG) 607 and inputted to the tunable dispersion equalizer 606. Further, dispersion variation amounts in accordance with respective wavelength channel groups derived from the above-described calculation are compensated by controlling the tunable dispersion equalizer 606 by the controller 604.

Sixth Embodiment

In the constitution shown in FIG. 7, in place of the chirped fiber Bragg grating, a variable dispersion equalizer of a planar lightwave circuit (PLC) type which is a variable dispersion equalizer of a filter type described in (K. Takiguchi et al., "Dispersion slope equalizer for dispersion shifted fiber using a lattice-form programmable optical filter on a planar lightwave circuit," J. Lightwave Technol., vol. 16, no. 9, p. 1647 (1998)) may be used.

Seventh Embodiment

In the constitution shown in FIG. 7, as a tunable dispersion equalizer, in place of the chirped fiber Bragg grating, LOTADE (M. Jablonski et al., "Adjustable coupled two-cavity allpass filter for dispersion slope compensation of optical fibres," Electron Lett., vol. 36, no. 6, p. 511 (2000)) which is a tunable dispersion equalizer of a filter type may be used.

Eighth Embodiment

Figure 9:
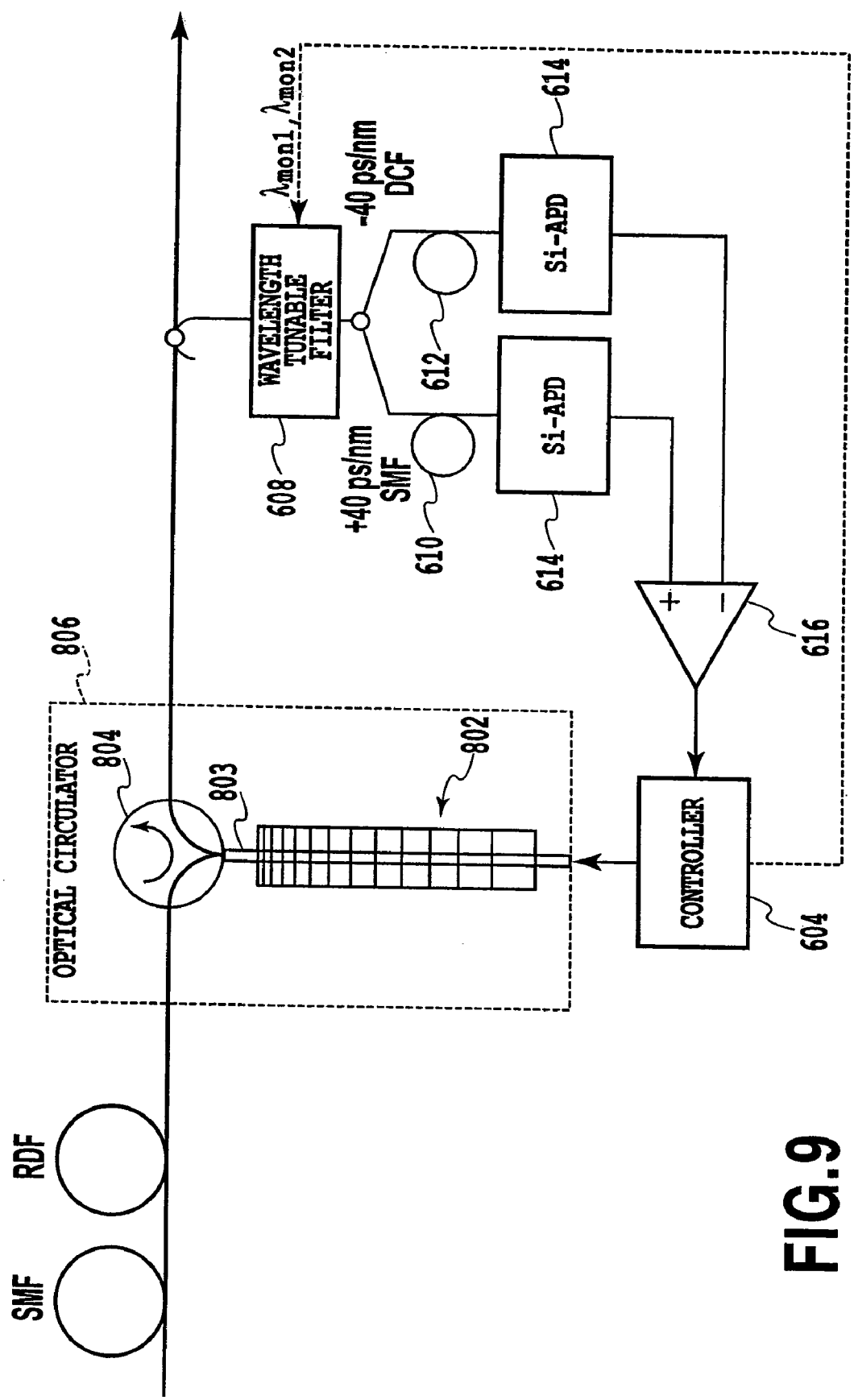
FIG. 9 illustrates a view showing an apparatus constitution of a dispersion slope temperature dependency compensating apparatus according to an eighth embodiment of the invention.

FIG. 9 shows an eighth embodiment of the invention.

Figure 10:
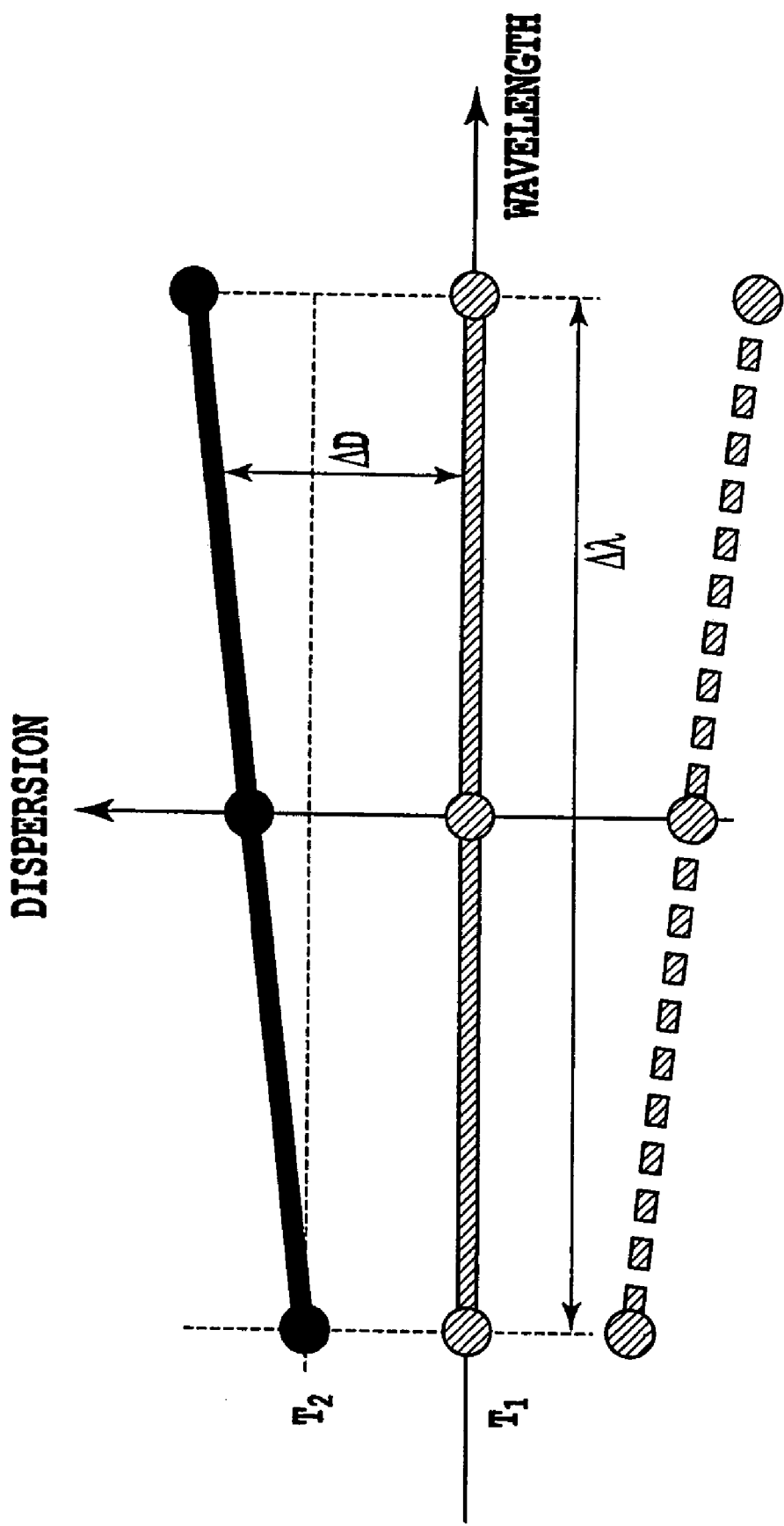
FIG. 10 illustrates a diagram for explaining a summarizingly dispersion compensating method of all of bandwidths.

According to the embodiment, as shown in FIG. 10, there is constructed a constitution of summarizingly compensating dispersions generated by a temperature change for all bandwidths. A tunable dispersion equalizer by a chirped fiber Bragg grating having a wide bandwidth is used.

Figure 11:
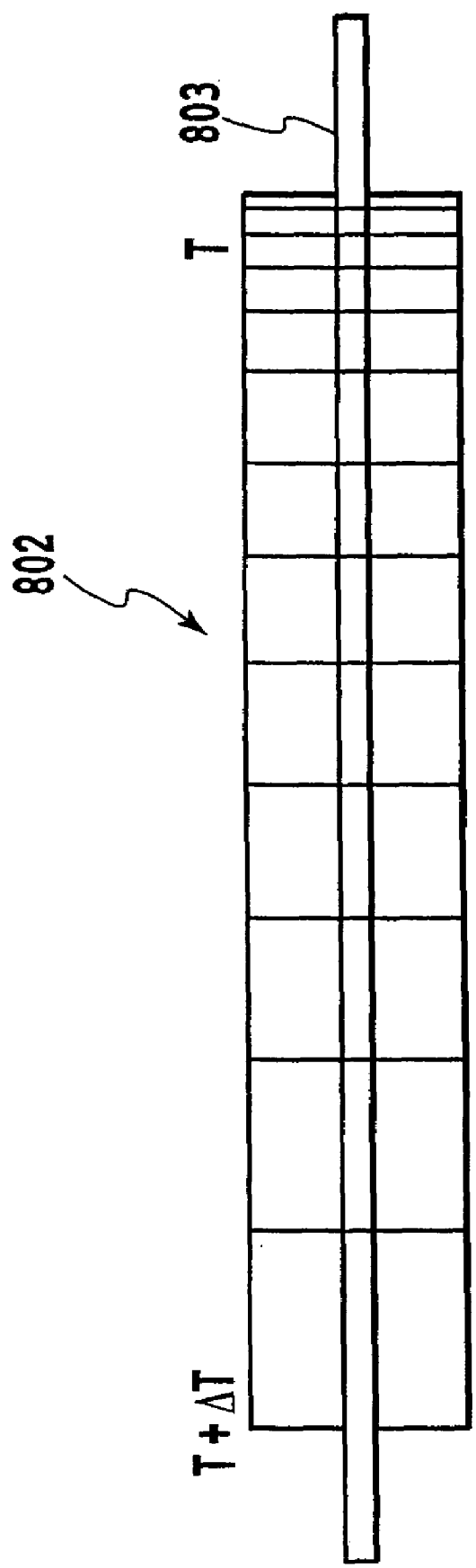
FIG. 11 illustrates a view of a tunable dispersion equalizer with a fiber Bragg grating capable of providing a temperature gradient in a longitudinal direction.

A tunable dispersion equalizer 806 of a dispersion slope temperature dependency compensating apparatus introduces an optical signal on the transmission optical fiber to a chirped fiber Bragg grating 803 by an optical circulator 804 and outputs the optical signal again to the transmission optical fiber. As shown in FIG. 11, a number of heaters 802 are attached in a longitudinal direction of the chirped fiber Bragg grating 803. Further, by attaching a temperature gradient in the longitudinal direction, a dispersion variation amount generated by a temperature change on the transmission optical fiber is cancelled by a dispersion variation amount having a reverse characteristic. The temperature dependency of the dispersion slope can be compensated by the method.

Ninth Embodiment

In the constitution shown in FIG. 9, in place of the heater of the eighth embodiment, a piezoelectric element can be used.

Figure 12:
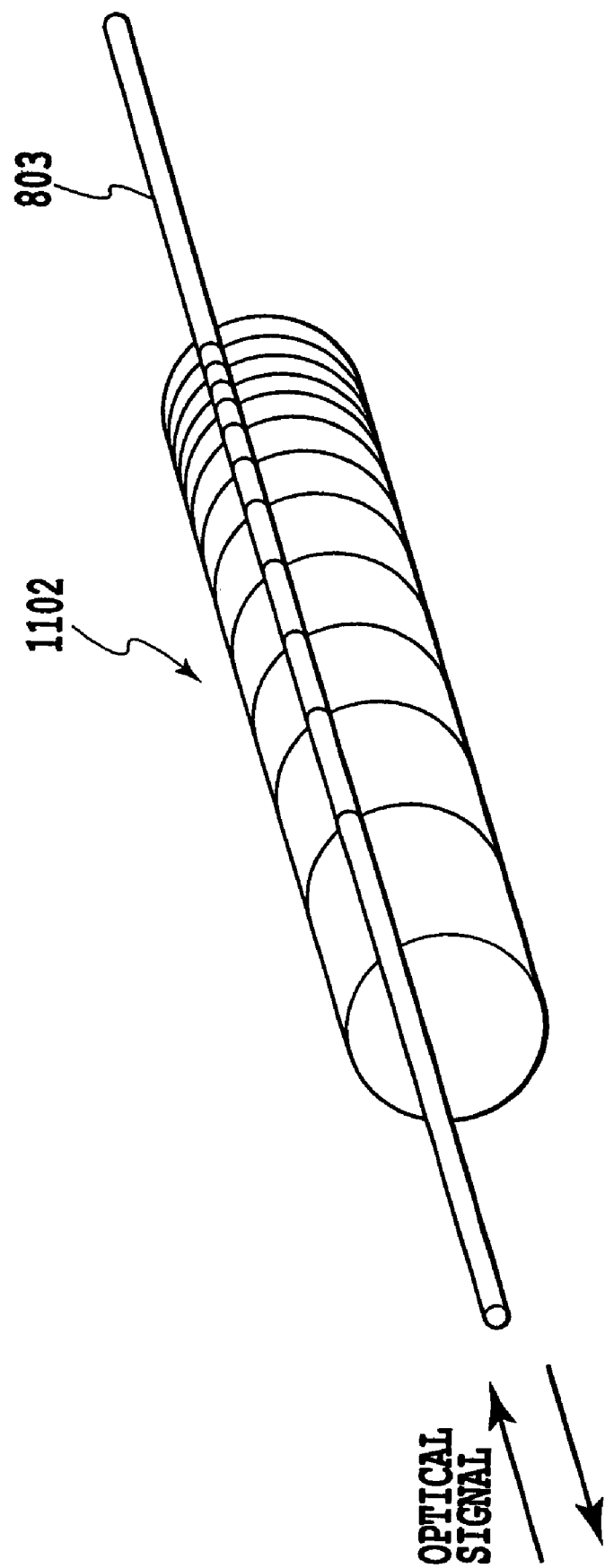
FIG. 12 illustrates a view of a tunable dispersion equalizer with a fiber Bragg grating capable of providing a strain distribution in a longitudinal direction.

As shown in FIG. 12, in a tunable dispersion equalizer according to a ninth embodiment of the invention, the chirped fiber Bragg grating 803 having a wide bandwidth is attached with piezoelectric elements 1102 divided in the longitudinal direction. Further, a dispersion generated by a temperature change is canceled by a dispersion variation amount having a reverse characteristic by changing an elongation and contraction amount of the piezoelectric element in the longitudinal direction. The temperature dependency of the dispersion slope can be compensated by the method.

Tenth Embodiment

Figure 13:
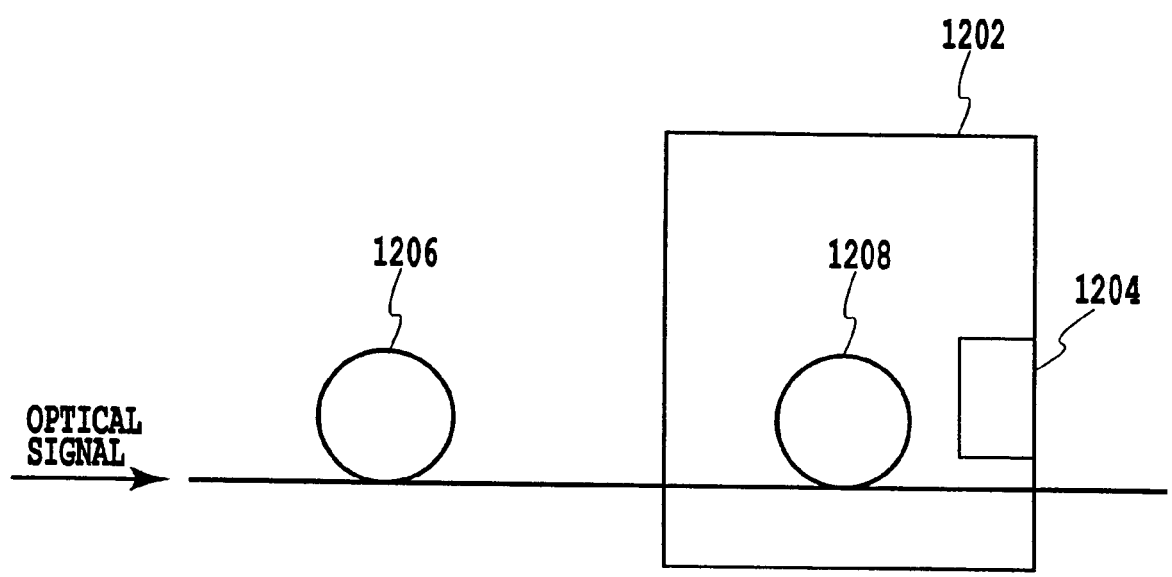
FIG. 13 illustrates a view showing a constitution of a dispersion slope temperature dependency compensating method according to a tenth embodiment of the invention.

FIG. 13 shows an optical fiber accommodation apparatus of the invention. The principle of the embodiment is that by finely controlling temperature of a periphery of a dispersion compensating fiber disposed in an optical node, a sum of influences of temperature dependencies of dispersion slopes of a transmission optical fiber and the dispersion compensating fiber in the optical node is restrained.

An optical fiber accommodation apparatus 1202 of the invention includes a temperature control circuit 1204 and contains a dispersion compensating fiber 1208 in an optical node. The transmission optical fiber is provided with a length of $L_1$(km) and a dispersion slope temperature constant of $\alpha_{T1}$(ps/nm²/km/deg) and the dispersion compensating fiber in the optical fiber accommodation apparatus is provided with a length of $L_2$(km) and a dispersion slope temperature constant of $\alpha_{T2}$(ps/nm²/km/deg). When a wavelength bandwidth of an optical system in an optical transmission system is $\Delta\lambda$(nm) and a range of an allowable dispersion in the transmission system is equal to or larger than $-\Delta D_0$(ps/mn, however, $\Delta D_0 > 0$) and equal to or smaller than $\Delta D_0$ and a temperature change throughout a year to which the transmission optical fiber is subjected is $\Delta T_1$(deg), a temperature change $\Delta T_2$(deg) to which the dispersion compensating fiber 1208 is subjected is set to satisfy the following equation by using the temperature control circuit 1204.

$$|\alpha_{T1} \cdot L_1 \cdot \Delta T_1 + \alpha_{T2} \cdot L_2 \cdot \Delta T_2| \cdot \Delta\lambda \leq \Delta D_0 \quad (4)$$

Thereby, the influences of the temperature dependencies of the dispersion slopes of the transmission optical fiber 1206 and the dispersion compensating fiber 1208 can be restrained.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A method of monitoring a dispersion on a transmission optical fiber in a wavelength division multiplexing optical transmission system in which a transmission distance is fixed and the dispersion of the transmission optical fiber has a slope that changes with respect to temperature changes, said method comprising the steps of:

extracting two or more of wavelength channels 1 to n from the transmission optical fiber; and monitoring dispersions of the extracted wavelength channels, comprising the steps of:

measuring a first dispersion value in the extracted wavelength channels 1 to n (wavelength: $\lambda_{mon1}$ to $\lambda_{monn}$) at a certain temperature $T_1(° C.)$ measuring a second dispersion value in the wavelength channels 1 to n at a certain other temperature $T_2(° C.)$;

providing dispersion variation amounts $\Delta D_{mon1}$ to $\Delta D_{monn}$ in the extracted wavelength channels 1 to n from a difference between the measured first dispersion value and the measured second dispersion value; and providing a dispersion variation amount at an arbitrary wavelength ($\lambda$) based on the provided dispersion variation amounts $\Delta D_{mon1}$ to $\Delta D_{monn}$;

wherein the steps of extracting and monitoring are performed by a dispersion monitoring apparatus.

2. The method according to claim 1, wherein the n is 2 and the step of providing the dispersion variation amount calculates a dispersion variation amount $\Delta D(\lambda)$ in an arbitrary wavelength ($\lambda$) by the following equation.

$$\Delta D(\lambda) = \frac{\Delta D_{mon2} - \Delta D_{mon1}}{\lambda_{mon2} - \lambda_{mon1}} \cdot (\lambda - \lambda_{mon1}) + \Delta D_{mon1}$$

3. The method according to claim 1, wherein the step of monitoring the dispersions comprises the steps of:

measuring a first dispersion value in a desired wavelength channel at a certain temperature T1(OC);

measuring a second dispersion value in the desired wavelength channel at a certain other temperature T2 (OC); and providing a dispersion variation amount in the desired wavelength channel from a difference between the measured first dispersion and the measured second dispersion value.

4. A method of compensating a temperature dependency of a dispersion slope in a wavelength division multiplexing optical transmission system in which a transmission distance is fixed and the dispersion slope of a transmission optical fiber changes with respect to temperature changes, said method comprising the steps of providing the dispersion variation amount $\Delta D(\lambda)$ by the method according to any one of claims 1, 2, and 3; and compensating the temperature dependency of the dispersion slope by using the provided dispersion variation amount $\Delta D(\lambda)$.

5. The method according to claim 4, wherein the step of compensating the temperature dependency of the dispersion slope comprises the steps of dividing a signal light on the transmission optical fiber to one or more wavelength channel groups constituted by at least one wavelength channel; and compensating the dispersion in accordance with each of the divided one or more wavelength channel groups.

6. The method according to claim 4, wherein the step of compensating the temperature dependency of the dispersion slope summarizingly compensates a wavelength dependency of the temperature dependency of the dispersion in all of bandwidths in a wavelength division multiplexing optical transmission system.

7. The method according to claim 5, wherein the step of compensating the dispersion is carried out by using one or more tunable dispersion equalizers with a fiber Bragg grating.

8. The method according to claim 5, wherein the step of compensating the dispersion is carried out by using one or more tunable dispersion equalizers with a filter.

9. The method according to claim 6, wherein the step of compensating the temperature dependency of the dispersion slope is carried out by using one or more tunable dispersion equalizers with a fiber Bragg grating.

10. The method according to claim 6, wherein the step of compensating the temperature dependency of the dispersion slope comprises the step of:

providing a temperature change in a dispersion compensating optical fiber installed at an optical node.

11. A dispersion monitoring apparatus for monitoring a dispersion on a transmission optical fiber in a wavelength division multiplexing optical transmission system in which a transmission distance is fixed and the dispersion of the transmission optical fiber has a slope that changes with respect to temperature changes, said dispersion monitoring apparatus comprising:

extracting means for extracting two or more of wavelength channels from the transmission optical fiber; and monitoring means for monitoring dispersions of the extracted wavelength channels, the monitoring means comprising:

means for measuring a first dispersion value in the extracted wavelength channels 1 to n (wavelength: $\lambda_{mon1}$ to $\lambda_{monn}$) at a certain temperature $T_1(° C.)$;

means for measuring a second dispersion value in the wavelength channels 1 to n at a certain other temperature $T_2(° C.)$;

means for providing dispersion variation amounts $\Delta D_{mon1}$ to $\Delta D_{monn}$ in the extracted wavelength channels 1 to n from a difference between the measured first dispersion value and the measured second dispersion value; and means for providing a dispersion variation amount at an arbitrary wavelength ($\lambda$) based on the provided dispersion variation amounts $\Delta D_{mon1}$ to $\Delta D_{monn}$.

12. A dispersion slope temperature dependency compensating apparatus for compensating a temperature dependency of a dispersion slope in a wavelength division multiplexing optical transmission system in which a transmission distance is fixed and the dispersion slope of a transmission optical fiber changes with respect to temperature changes, said dispersion slope temperature dependency compensating apparatus comprising:

monitoring means for monitoring dispersions of two or more of wavelength channels on the transmission optical fiber, the monitoring means comprising:

means for measuring a first dispersion value in the extracted wavelength channels 1 to n (wavelength: $\lambda_{mon1}$ to $\lambda_{monn}$) at a certain temperature $T_1(° C.)$;

means for measuring a second dispersion value in the wavelength channels 1 to n at a certain other temperature $T_2(° C.)$;

means for providing dispersion variation amounts $\Delta D_{mon1}$ to $\Delta D_{monn}$ in the extracted wavelength channels 1 to n from a difference between the measured first dispersion value and the measured second dispersion value; and means for providing a dispersion variation amount at an arbitrary wavelength (λ) based on the provided dispersion variation amounts $\Delta D_{mon1}$ to $\Delta D_{monn}$; and compensating means for compensating a wavelength dependency of the temperature dependency of the dispersion in an arbitrary wavelength channel by using the monitored dispersions.

13. The dispersion slope temperature dependency compensating apparatus according to claim 12, wherein said compensating means comprising:

means for dividing a signal light on the transmission optical fiber into one or more wavelength channel groups constituted by at least one wavelength channel; and means for compensating the dispersion in accordance with each of the divided one or more wavelength channel groups.

14. The dispersion slope temperature dependency compensating apparatus according to claim 12, wherein said compensating means summarizingly compensates the wavelength dependency of the temperature dependency of the dispersion in all of bandwidths in a wavelength division multiplexing optical transmission system.

15. The dispersion slope temperature dependency compensating apparatus according to claim 13, wherein said compensating means includes one or more tunable dispersion equalizers with a fiber Bragg grating.

16. The dispersion slope temperature dependency compensating apparatus according to claim 13, wherein said compensating means includes one or more tunable dispersion equalizers with a filter.

17. The dispersion slope temperature dependency compensating apparatus according to claim 14, wherein said compensating means includes one or more tunable equalizers with a fiber Bragg grating.

18. The dispersion slope temperature dependency compensating apparatus according to claim 14, wherein said compensating means comprises:

a dispersion compensating optical fiber installed in an optical node; and means for providing a temperature change to the dispersion compensating optical fiber.

* * * * *